(12) United States Patent
Lowmaster

(10) Patent No.: US 7,260,089 B2
(45) Date of Patent: Aug. 21, 2007

(54) REMOTE WORKER ACCESS ON NETWORKED PBX SYSTEMS USING A VOIP PLATFORM

(75) Inventor: Robert Paul Lowmaster, Bartlett, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 539 days.

(21) Appl. No.: 10/947,050

(22) Filed: Sep. 22, 2004

(65) Prior Publication Data
US 2006/0062204 A1 Mar. 23, 2006

(51) Int. Cl.
H04L 12/66 (2006.01)

(52) U.S. Cl. ............ 370/352; 370/354; 370/360; 370/401; 379/201.02; 379/207.12

(58) Field of Classification Search ........ 370/352–354, 370/360, 401–402; 379/201.02, 201.12, 379/207.12, 207.13, 207.15, 211.02, 212.01
See application file for complete search history.

(56) References Cited

U.S. PATENT DOCUMENTS

| 5,185,785 | A  | * | 2/1993  | Funk et al. ............ 379/111 |
| 5,724,417 | A  | * | 3/1998  | Bartholomew et al. 379/211.05 |
| 5,835,580 | A  | * | 11/1998 | Fraser ............... 379/115.01 |
| 6,130,935 | A  | * | 10/2000 | Shaffer et al. ......... 379/127.03 |
| 6,359,892 | B1 | * | 3/2002  | Szlam ............... 370/401 |
| 2002/0181398 | A1 | * | 12/2002 | Szlam ............... 370/230 |
| 2005/0147226 | A1 | * | 7/2005  | Anupam et al. ........ 379/201.02 |

* cited by examiner

Primary Examiner—Binh K. Tieu
(74) Attorney, Agent, or Firm—Toler Schaffer LLP

(57) ABSTRACT

A Voice over Internet Protocol (VoIP) feature server provides a remote worker feature over a VoIP platform of an IP network. The remote worker feature facilitates an individual, who is assigned a telephone number at his/her home PBX, to receive telephone service from a remote PBX using the same telephone number.

20 Claims, 3 Drawing Sheets

REMOTE WORKER ACCESS ON NETWORKED PBX SYSTEMS USING A VOIP PLATFORM

FIELD OF THE DISCLOSURE

The present disclosure relates to private branch exchange (PBX) systems.

BACKGROUND

U.S. Pat. No. 5,247,571 to Kay et al. discloses an area-wide Centrex service. Among the features provided by the area-wide Centrex service is an extension dialing feature. The extension dialing feature allows a multi-location customer to provide a specialized, abbreviated dialing plan for calls between multiple locations. Using this feature, an area-wide Centrex station user can call any other station in the area-wide Centrex network using the specialized dialing plan. This feature offers multi-location Centrex customers a uniform abbreviated dialing plan between their PBX locations, Centrex locations, ISDN lines, and residential lines for people working from home.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE DRAWINGS

Embodiments of the present invention use a Voice over Internet Protocol (VoIP) provider's Internet Protocol (IP) network to allow an employee, who is assigned a telephone number at his/her home PBX, to receive telephone service from a remote PBX using the same telephone number. The telephone service enables the employee to receive and place telephone calls from the remote PBX without incurring additional charges for the calls. This service is well-suited for multi-location customers who have multiple locations served by PBX systems.

Figure 1:
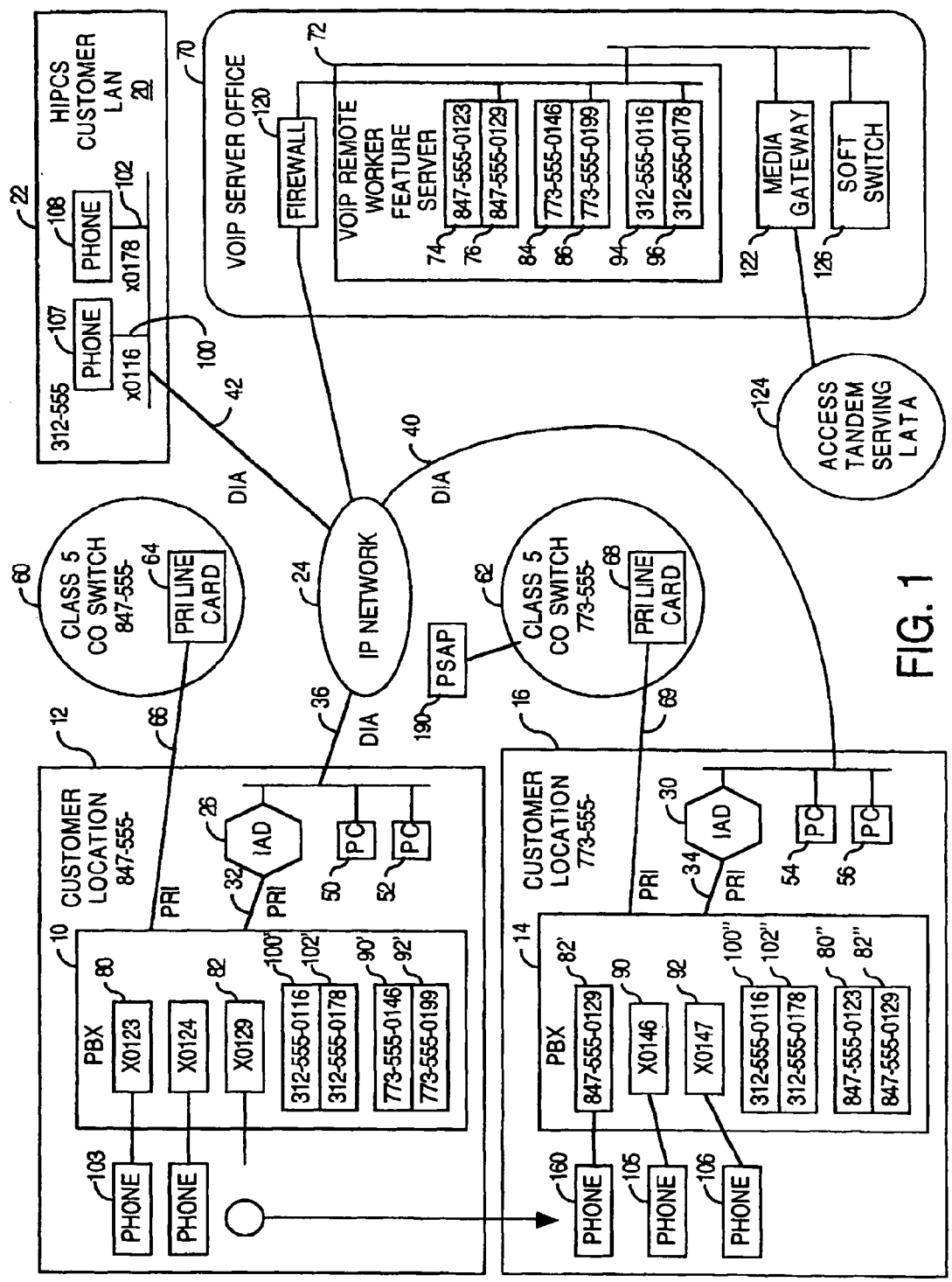
FIG. 1 is a block diagram of an embodiment of a system to provide remote worker access on networked PBX systems over a VoIP platform.

FIG. 1 is a block diagram of an embodiment of a system to provide remote worker access on networked PBX systems over a VoIP platform. In general, the system can be used to provide the remote worker feature between any number of PBXs, each of which serving a different customer location. However, for purposes of illustration and example, the system is described with reference to a PBX 10 at a customer location 12, a PBX 14 provided to a customer location 16, and a VoIP customer local area network (LAN), such as a Hosted IP Communication Service (HIPCS) LAN 20, at a customer location 22.

An access point to a VoIP provider's IP network 24 is placed at each of the PBXs. The access points enable the various PBXs to communicate and interwork with each other over the VoIP provider's IP network 24. The VoIP provider further may permit the PBXs to interwork with their VoIP-served locations (e.g. the customer location 22), as well as place calls to other destinations via the IP network 24.

In one embodiment, an Integrated Access Device (IAD) is deployed as a Customer-Provided Equipment (CPE) endpoint on each of the PBXs. Each IAD serves as a customer-provided media gateway that converts analog time-division multiplexed (TDM) voice traffic into IP packetized voice (e.g. VoIP) signals, and vice-versa. With reference to the example in FIG. 1, an IAD 26 is deployed at the customer location 12 to serve the PBX 10, and an IAD 30 is deployed at the customer location 16 to serve the PBX 14.

As illustrated in FIG. 1, the PBX 10 may interface to the IAD 26 by a Primary Rate Interface (PRI) 32. Alternatively, the interface of the PBX 10 to the IAD 26 may comprise stations of the PBX 10 since the PBX 10 is under full customer control. Similarly, the PBX 14 may interface to the IAD 30 by a PRI 34. Alternatively, the interface of the PBX 14 to the IAD 30 may comprises stations of the PBX 14 since the PBX 14 is under full customer control.

The IP network 24 managed by the VoIP provider interfaces to the IADs over an Internet access facility such as Dedicated Internet Access (DIA), for example. In the example of FIG. 1, the IAD 26 interfaces to the IP network 24 over a DIA 36 or an alternative Internet access facility to provide access to the IP network by the PBX 10. The IAD 30 interfaces to the IP network 24 over a DIA 40 or an alternative Internet access facility to provide access to the IP network 24 by the PBX 14. The VoIP customer LAN 20 at the customer location 22 interfaces, without an IAD, to the IP network 24 over a DIA 42 or an alternative Internet access facility.

The IAD 26 converts traditional outgoing voice signals of the PBX 10 into VoIP packets, and delivers the packets to the VoIP provider's IP network 24 over the DIA 36 or alternative Internet access facility. Similarly, the IAD 30 converts traditional outgoing voice signals of the PBX into VoIP packets, and delivers the packets to the VoIP provider's IP network 24 over the DIA 40 or alternative Internet access facility.

For incoming VoIP signals to the PBX 10, the IAD 26 receives VoIP packets over the DIA 36 or alternative Internet access facility, converts the VoIP packets into a traditional voice call signal, and delivers the signal to the PBX 10. Similarly, for incoming VoIP signals to the PBX 14, the IAD 30 receives VoIP packets over the DIA 40 or alternative Internet access facility, converts the VoIP packets into a traditional voice call signal, and delivers the signal to the PBX 14.

Calls placed between the PBXs 10 and 14 are transmitted across the VoIP provider's IP network 24, and potentially over the Internet, as on-net VoIP data transmissions. The VoIP data transmission is part of an Internet Service Provider's (ISP's) information service. The ISP's information service may further provide Internet access to one or more computers 50 and 52 at the customer location 12 via the DIA 42, and one or more computers 54 and 56 at the customer location 16 via the DIA 40. The IAD 26 and the computers 50 and 52 access the DIA 36 via a LAN at the customer location 12. Similarly, the IAD 30 and the computers 54 and 56 access the DIA 40 via a LAN at the customer location 16.

Intra-PBX calls provided in this way have no telco-related charges (e.g. no incumbent local exchange carrier charges or interexchange carrier charges) because the calls never reach a Public Switched Telephone Network (PSTN). For example, the intra-PBX calls provided in this way do not reach a Class 5 central office switch 60 that serves the PBX 10, or a Class 5 central office switch 62 that serves the PBX 14. The Class 5 switch 60 may comprise a PRI line card 64 to interface with the PBX 10 via a PRI 66. The Class 5 switch 62 may comprise a PRI line card 68 to interface with the PBX 14 via a PRI 69.

The VoIP service provider has an associated VoIP server office 70 in communication with the IP network 24. The VoIP server office 70 has a VoIP remote worker feature server 72 on which number ranges for the PBX 10, the PBX 14 and the VoIP customer LAN 20 are built and maintained to assist in routing calls. For purposes of illustration and example, the feature server 72 stores: data elements 74 and 76 for telephone numbers 80 and 82, respectively, of the PBX 10; data elements 84 and 86 for telephone numbers 90 and 92, respectively, of the PBX 14; and data elements 94 and 96 for telephone numbers 100 and 102, respectively, of the VoIP customer LAN 20.

At the customer location 12, a telephone 103 is an end station for the telephone number 80. At the customer location 16, telephones 105 and 106 are end stations for the telephone numbers 90 and 92, respectively. At the customer location 22, telephones 107 and 108 are end stations for the telephone numbers 100 and 102, respectively.

In general, number ranges associated with all foreign PBXs and VoIP provider-served locations that are to be included in the interworking arrangement are to be added to and maintained in routing tables of the PBXs. In the example of FIG. 1, the PBX 10 is modified to store the number range of the PBX 14 and the number range of the VoIP customer LAN 20 in its routing table. Thus, data elements 90' and 92' for the telephone numbers 90 and 92 of the PBX 14, and data elements 100' and 102' for the telephone numbers 100 and 102 of the VoIP customer LAN 20 are added to and stored in the routing table of the PBX 10 with instructions to route outgoing calls to these numbers to the IAD 26. The IAD 26 converts the calls into VoIP packets, and communicates the calls to the IP network 24 for processing by the VoIP server office 70.

Similarly, the PBX 14 is modified to store the number range of the PBX 10 and the number range of the VoIP customer LAN 20 in its routing table. Thus, data elements 80" and 82" for the telephone numbers 80 and 82 of the PBX 10 and data elements 100" and 102" for the telephone numbers 100 and 102 of the VoIP customer LAN 20 are added to and stored in the routing table of the PBX 14 with instructions to route outgoing calls to these numbers to the IAD 30. The IAD 30 converts the calls into VoIP packets, and communicates the calls to the IP network 24 for processing by the VoIP server office 70.

The VoIP server office 70 comprises a firewall 120 which interfaces the remote worker feature server 72 to the IP network 24. The remote worker feature server 72 facilitates calls, either incoming to the remote worker or outgoing from the remote worker, through the IP network 30 to their intended destinations based on its stored number ranges. The VoIP server office 70 also includes a media gateway 122 to enable its VoIP served customers to place calls to the PSTN via an access tandem 124. The media gateway 122 is controlled by a soft switch 126.

For purposes of illustration and example, consider a worker whose home PBX is the PBX 10 at the customer location 12. The worker has assigned to him/her a telephone number of 847-555-0129 that typically resides on the PBX 10. Consider the worker, who normally works at the customer location 12, traveling to the customer location 16 to work for some period of time. The remote worker feature enables the worker to receive telephone service (e.g. receive incoming calls and place outgoing calls) at a remote PBX (e.g. the PBX 14 at the customer location 16) using the same telephone number (e.g. 847-555-0129).

Methods of providing incoming and outgoing calls to enable the worker to use his/her telephone number of 847-555-0129 at the PBX 14 at the customer location 16 are described with reference to FIGS. 2 and 3.

Figure 2:
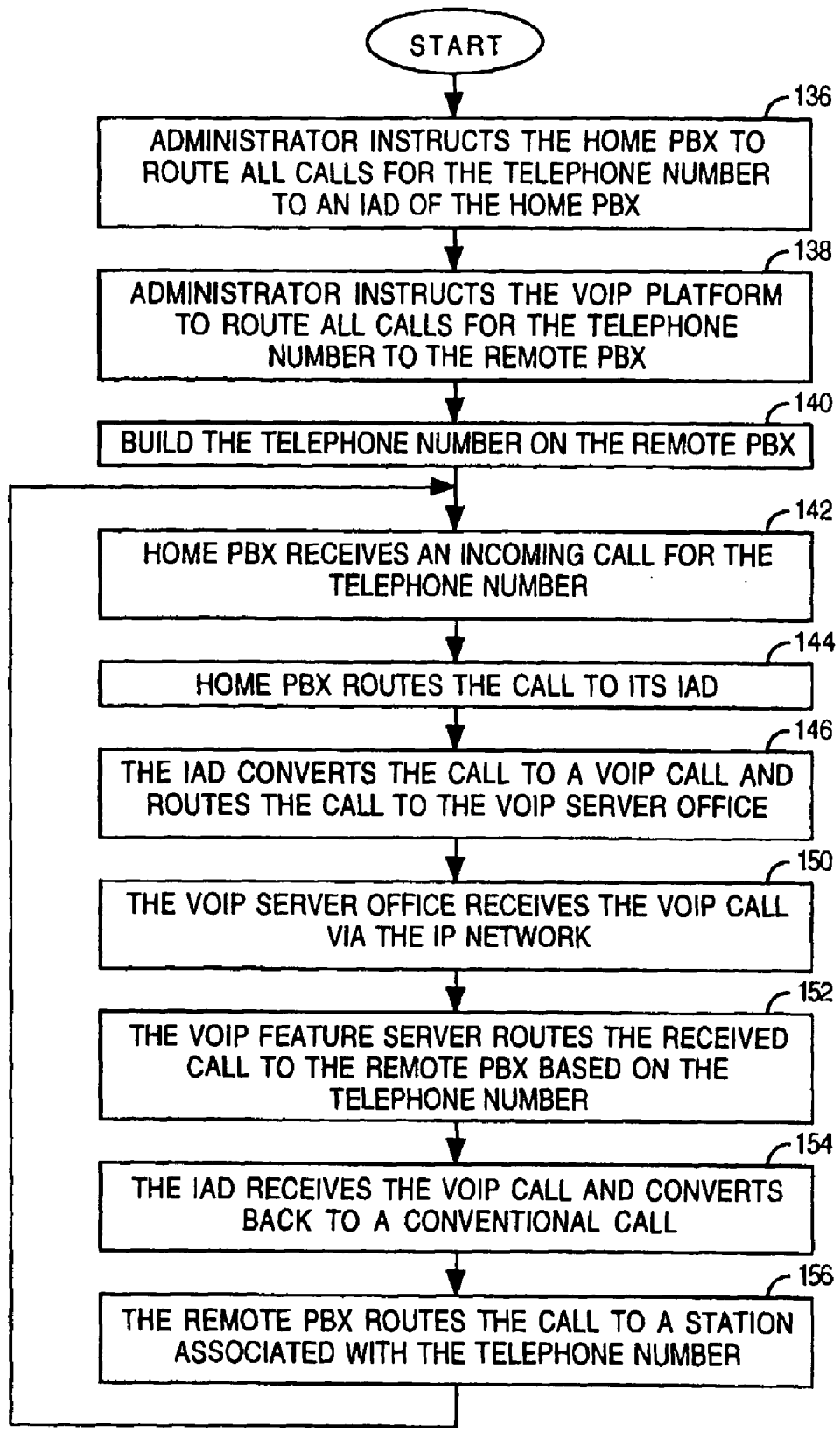
FIG. 2 is a flow chart of an embodiment of a method of providing incoming calls to a remote worker.

FIG. 2 is a flow chart of an embodiment of a method of providing incoming calls to a remote worker having a particular telephone number. To initiate the remote worker feature, acts indicated by blocks 136, 138 and 140 are performed. These acts may be performed in an order that differs from the order depicted in FIG. 2.

As indicated by block 136, an administrator instructs the home PBX to route all calls for the telephone number to the IAD of the home PBX. In the above example, the PBX 10 is instructed to route all calls for 847-555-0129 to the IAD 26.

As indicated by block 138, the administrator further instructs the VoIP platform to route all calls for the telephone number to the remote PBX. In the above example, the remote worker feature server 72 is instructed to route all calls for 847-555-0129 to the PBX 14.

As indicated by block 140, the method comprises building the telephone number of the remote worker on the remote PBX. In the above example, the telephone number 82' of 847-555-0129 is built on the PBX 14.

As indicated by block 142, an incoming call for the telephone number is initially received by the home PBX. In the above example, the incoming call for 847-555-0129 is received by the PBX 12. The incoming call may be received from the Class 5 switch 60.

As indicated by block 144, the home PBX routes the received call to its IAD. In the above example, the PBX 12 routes the incoming call for 847-555-0129 to the IAD 26.

As indicated by block 146, the IAD of the home PBX converts the call to VoIP and routes the call to the VoIP server office 70. In the above example, the IAD 26 converts the call to a VoIP call, and routes the VoIP call to the VoIP server office 70 via the DIA 36 or alternative Internet access facility and the IP network 24.

As indicated by block 150, the VoIP server office 70 receives the VoIP call via the IP network 24. As indicated by block 152, the remote worker feature server 70 routes the VoIP call to the IAD of the remote PBX based on the telephone number. In the above example, the remote worker feature server 70 routes the VoIP call to the IAD 30 of the PBX 14 via the IP network 24 and the DIA 40.

As indicated by block 154, the VoIP call is received by the IAD at the remote PBX, and is converted back to a conventional call. In the above example, the VoIP call is received by the IAD 30, which converts the VoIP call to a conventional call, and provides the conventional call to the PBX 14 via the PRI 34.

As indicated by block 156, the remote PBX routes the call to a station associated with the telephone number. In the above example, the PBX 14 routes the call received from the IAD 30 to a telephone 160 associated with the telephone number 847-555-0129 as previously instructed by the administrator.

Figure 3:
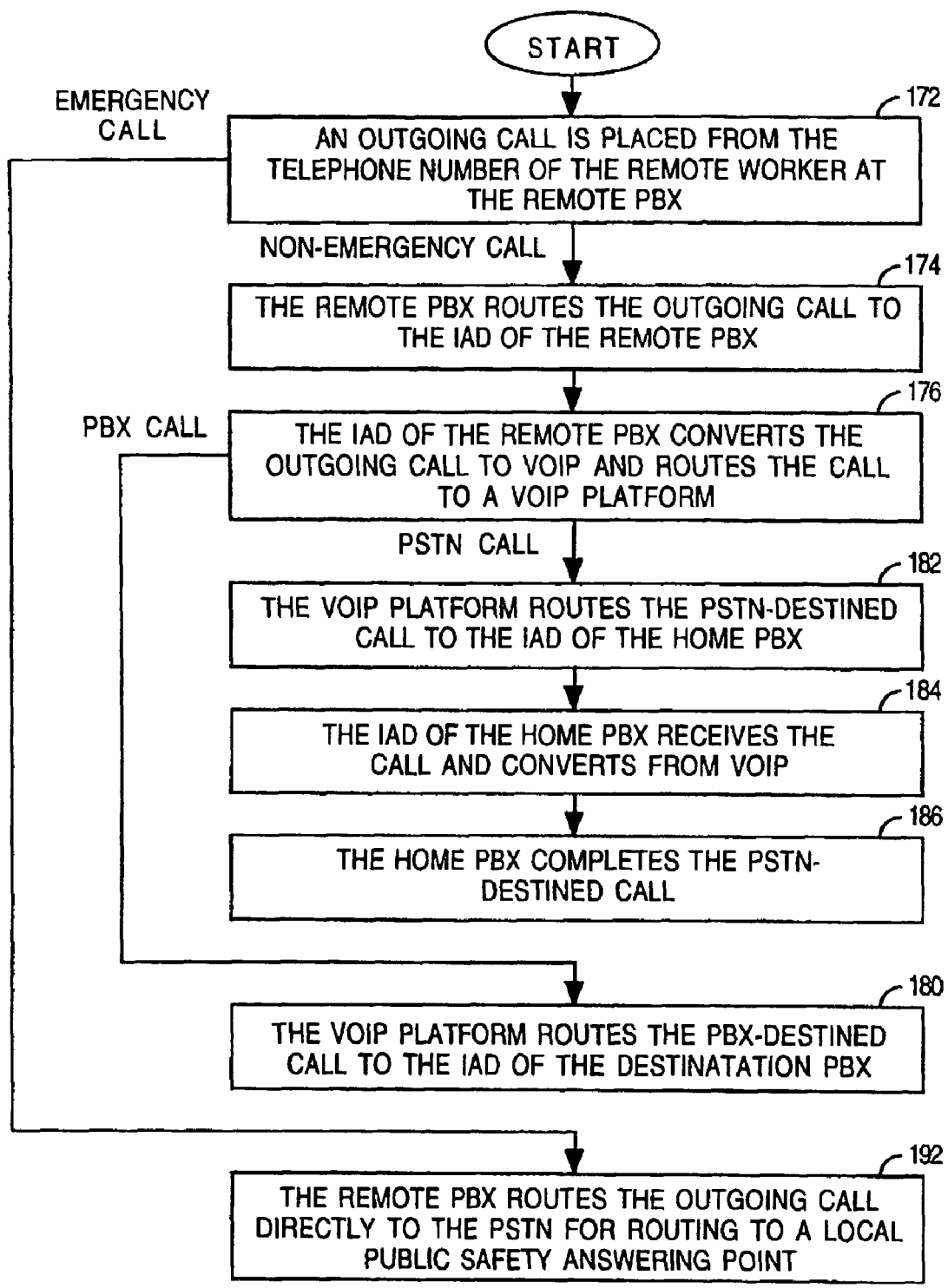
FIG. 3 is a flow chart of an embodiment of a method of providing outgoing calls placed by the remote worker.

FIG. 3 is a flow chart of an embodiment of a method of providing outgoing calls placed by the remote worker.

As indicated by block 172, an outgoing call is placed from the telephone number of the remote worker at the remote PBX. In the above example, the outgoing call is placed from the telephone 160 associated with the telephone number 847-555-0129 at the PBX 14.

If the outgoing call is destined to a non-emergency telephone number (e.g. a number other than 9-1-1), then the remote PBX routes the outgoing call to its IAD as indicated by block 174. In the above example for the case of a non-emergency telephone call, the PBX 14 routes the outgoing call to the IAD 30.

As indicated by block 176, the IAD of the remote PBX converts the call to VoIP and routes the call to the VoIP server office 70. In the above example, the IAD 30 converts the call to a VoIP call, and routes the VoIP call to the VoIP server office 70 via the DIA 40 or alternative Internet access facility and the IP network 24.

The VoIP server office 70 processes the VoIP call based upon whether the outgoing call is destined to any of the networked PBX systems or to the PSTN. If the outgoing call is destined to any of the networked PBX systems, then the remote worker feature server 72 directs the VoIP platform to route the VoIP call to the IAD of the destination PBX, as indicated by block 180.

If the outgoing call is destined to the PSTN, then the remote worker feature server 72 directs the VoIP platform to route the VoIP call to the IAD of the home PBX, as indicated by block 182. As indicated by block 184, the IAD of the home PBX receives the VoIP call and converts the VoIP call back to its conventional form. The home PBX completes the call destined for the PSTN, as indicated by block 186.

In the above example for the case of a PSTN destination, the remote worker feature server 72 routes the VoIP call to the IAD 26 of the PBX 10 via the DIA or alternative Internet access facility and the IP network 24. The IAD 26 receives and converts the VoIP call back to a conventional call. The PBX 10 completes the call via the Class 5 switch 60.

As an alternative to the acts indicated by blocks 182, 184 and 186, the VoIP platform can complete all calls to destinations not served by any of the customer PBX locations using its own PSTN interface off of the VoIP network. For example, the PSTN calls can be completed by the media gateway 122 via the access tandem 124.

If the outgoing call is destined to an emergency telephone number (e.g. 9-1-1), the remote PBX routes the outgoing call directly to the PSTN for proper routing to a local Public Safety Answering Point (PSAP) 190, as indicated by block 192. The PBX billing number is used as an Automatic Number Identification (ANI) number for the outgoing call to allow an emergency service to appropriately respond to the outgoing call. In the above example for the case of an emergency call, the PBX 14 directs the emergency call to the Class 5 switch 62, which in turn routes the call to the local PSAP 190.

It will be apparent to those skilled in the art that the disclosed embodiments may be modified in numerous ways and may assume many embodiments other than the preferred forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a Voice over Internet Protocol (VoIP) feature server that provides a remote worker feature over a VoIP platform of an IP network to facilitate an individual, who is assigned a telephone number at his/her home PBX, to receive telephone service from a remote PBX using the same telephone number.

2. The system of claim 1 further comprising:
   a first Integrated Access Device (IAD) at a location of the home PBX to communicate, to the VoIP feature server via the IP network, an incoming call for the telephone number that is received by the home PBX.

3. The system of claim 2 further comprising:
   a second IAD at a location of the remote PBX, wherein the VoIP feature server is to receive the incoming call from the first IAD via the IP network, and to route the incoming call to the second IAD via the IP network.

4. The system of claim 3 wherein the second IAD is to provide the incoming call to the remote PBX, and wherein the remote PBX is to route the incoming call to a station associated with the telephone number.

5. The system of claim 1 further comprising:
   an Integrated Access Device (IAD) at a location of the remote PBX;
   wherein if an outgoing call placed by the telephone number at the remote PBX is a non-emergency destined call, the remote PBX routes the outgoing call to the IAD.

6. The system of claim 5 wherein the IAD is to route the outgoing call to the VoIP feature server via the IP network.

7. The system of claim 6 wherein the VoIP feature server is to process the outgoing call based on whether the outgoing call is a PBX-destined call or a Public Switched Telephone Network (PSTN)-destined call.

8. The system of claim 7 wherein the outgoing call is a PSTN-destined call, and wherein the VoIP feature server is to route the PSTN-destined call via the IP network to the home PBX.

9. The system of claim 8 wherein the home PBX is to complete the PSTN-destined call via a switch.

10. The system of claim 7 wherein the outgoing call is a PBX-destined call, and wherein the VoIP feature server is to route the PBX-destined call via the IP network to a destination PBX.

11. A method comprising:
    providing a Voice over Internet Protocol (VoIP) remote worker feature over a VoIP platform of an IP network to facilitate an individual, who is assigned a telephone number at his/her home PBX, to receive telephone service from a remote PBX using the same telephone number.

12. The method of claim 11 wherein said providing the VoIP remote worker feature comprises:
    receiving, by the home PBX, an incoming call for the telephone number; and
    routing the incoming call from the home PBX to a VoIP feature server via the IP network.

13. The method of claim 12 wherein said providing the VoIP remote worker feature further comprises:
    routing the incoming call from the VoIP feature server to the remote PBX via the IP network.

14. The method of claim 13 wherein said providing the VoIP remote worker feature further comprises:
    routing the incoming call by the remote PBX to a station associated with the telephone number at the remote PBX.

15. The method of claim 11 wherein said providing the VoIP remote worker feature further comprises:
    routing an outgoing call placed by the telephone number at the remote PBX to an Integrated Access Device (IAD) of the remote PBX.

16. The method of claim 15 wherein said providing the VoIP remote worker feature further comprises:

routing the outgoing call from the IAD to a VoIP feature server via the IP network.

17. The method of claim 16 wherein said providing the VoIP remote worker feature further comprises:

processing the outgoing call by the VoIP feature server based on whether the outgoing call is a PBX-destined call or a Public Switched Telephone Network (PSTN)-destined call.

18. The method of claim 17 wherein the outgoing call is a PSTN-destined call, and wherein said providing the VoIP remote worker feature further comprises:

routing the PSTN-destined call from the VoIP feature server to the home PBX via the IP network.

19. The method of claim 18 wherein said providing the VoIP remote worker feature further comprises:

completing the PSTN-destined call by the home PBX via a switch.

20. The method of claim 17 wherein the outgoing call is a PBX-destined call, and wherein said providing the VoIP remote worker feature further comprises:

routing the PBX-destined call from the VoIP feature server to a destination PBX via the IP network.

* * * * *